(12) United States Patent
Fahrbach et al.

(10) Patent No.: US 11,067,781 B2
(45) Date of Patent: Jul. 20, 2021

(54) MICROSCOPE AND METHOD FOR LOCALIZING FLUORESCENT MOLECULES IN THREE SPATIAL DIMENSIONS

(71) Applicant: Leica Microsystems CMS GmbH, Wetzlar (DE)

(72) Inventors: Florian Fahrbach, Mannheim (DE); Frank Sieckmann, Eppingen-Elsenz (DE); Christian Schumann, Lich (DE); Oliver Schlicker, Wetzlar (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 423 days.

(21) Appl. No.: 16/098,472

(22) PCT Filed: May 2, 2017

(86) PCT No.: PCT/EP2017/060390
§ 371 (c)(1),
(2) Date: Apr. 17, 2019

(87) PCT Pub. No.: WO2017/191121
PCT Pub. Date: Nov. 9, 2017

(65) Prior Publication Data
US 2019/0250390 A1    Aug. 15, 2019

(30) Foreign Application Priority Data

May 3, 2016 (DE) .......................... 102016108259.7
Dec. 2, 2016 (DE) .......................... 102016123387.0

(51) Int. Cl.
*G02B 21/06* (2006.01)
*G02B 21/00* (2006.01)
(Continued)

(52) U.S. Cl.
CPC ..... *G02B 21/0076* (2013.01); *G02B 21/0032* (2013.01); *G02B 21/16* (2013.01);
(Continued)

(58) Field of Classification Search
CPC ............ G02B 21/0076; G02B 21/0032; G02B 21/16; G02B 21/367; G02B 27/58;
(Continued)

(56) References Cited

U.S. PATENT DOCUMENTS

| 725,567 A | 4/1903 | Ives |
| 10,877,254 B2 * | 12/2020 | Knebel ................ G02B 21/006 |

(Continued)

FOREIGN PATENT DOCUMENTS

| DE | 102008009216 A1 | 8/2009 |
| DE | 102009043744 A1 | 3/2011 |

(Continued)

OTHER PUBLICATIONS

Francesca Cella Zanacchi, et al., "Live-cell 3D super-resolution imaging in thick biological samples", Nature Methods, vol. 8, No. 12, Dec. 2011, pp. 1047-1050.

(Continued)

*Primary Examiner* — Arnel C Lavarias
(74) *Attorney, Agent, or Firm* — Leydig, Voit & Mayer, Ltd.

(57) ABSTRACT

A microscope includes illumination optics for fluorescence excitation of point light sources of a sample, detection optics and a camera having a sensor. A density of the point light sources is kept low so as to minimize a crossover of point light sources that are behind or close to one another in each image captured by the camera. A means for subdividing a detection aperture into individual sub-apertures is provided in a beam path of the detection optics such that images generated by the individual sub-apertures on the sensor of the camera depict an object volume from different spatial directions.

22 Claims, 3 Drawing Sheets

(51) Int. Cl.
*G02B 21/36* (2006.01)
*G02B 27/58* (2006.01)
*G02B 21/16* (2006.01)

(52) U.S. Cl.
CPC .......... *G02B 21/367* (2013.01); *G02B 27/58* (2013.01); *G02B 2207/113* (2013.01); *G02B 2207/129* (2013.01)

(58) Field of Classification Search
CPC ........ G02B 2207/113; G02B 2207/129; G02B 21/00; G02B 21/002; G02B 21/0028; G02B 21/36; G02B 21/361
USPC ........ 359/388, 362, 363, 368, 369, 385, 390
See application file for complete search history.

(56) References Cited

U.S. PATENT DOCUMENTS

| | | | |
|---|---|---|---|
| 2008/0180792 A1* | 7/2008 | Georgiev | G02B 21/367 359/368 |
| 2011/0036996 A1 | 2/2011 | Wolleschensky et al. | |
| 2012/0224034 A1 | 9/2012 | Kalkbrenner et al. | |
| 2014/0263963 A1* | 9/2014 | Broxton | H04N 5/225 250/208.1 |
| 2017/0205615 A1* | 7/2017 | Vaziri | G02B 21/367 |
| 2017/0261731 A1* | 9/2017 | Shimada | G02B 21/025 |
| 2018/0203217 A1 | 7/2018 | Knebel et al. | |

FOREIGN PATENT DOCUMENTS

| | | |
|---|---|---|
| EP | 2244484 A1 | 10/2010 |
| WO | WO 2008092074 A1 | 7/2008 |
| WO | WO 2016020684 A1 | 2/2016 |
| WO | WO 2017013054 A1 | 1/2017 |

OTHER PUBLICATIONS

Peter Menzel, et al., "Using a novel light field measurement system to simultaneously measure 3D-3C velocity fields and 3D surface profiles", Fachtagung "Lasermethoden in der Strömungsmesstechnik", Sep. 9-11, 2014, pp. 1-10.

* cited by examiner

MICROSCOPE AND METHOD FOR LOCALIZING FLUORESCENT MOLECULES IN THREE SPATIAL DIMENSIONS

CROSS-REFERENCE TO PRIOR APPLICATIONS

This application is a U.S. National Stage Application under 35 U.S.C. § 371 of International Application No. PCT/EP2017/060390 filed on May 2, 2017, and claims benefit to German Patent Application Nos. DE 10 2016 108 259.7 filed on May 3, 2016, and DE 10 2016 123 387.0 filed on Dec. 2, 2016. The International Application was published in German on Nov. 9, 2017, as WO 2017/191121 A1 under PCT Article 21(2).

FIELD

The present invention relates to a microscope and a method for localizing fluorescent molecules in three spatial dimensions.

BACKGROUND

A thin sample is required for localization techniques using widefield/EPI fluorescence excitation, and only the fluorophores in the region of a thin layer around the focal planes of the detection objective can be localized. This region is typically very narrow, since the depth of field of the objectives used for localization is very shallow.

In order to limit the fluorescence excitation to a thin region, total internal reflection (TIR) illumination is also used.

Localization using light sheet illumination improves the signal-to-noise ratio and makes localization possible even in thick samples. It is not possible for there to be precise localization along the detection axis (z-axis) inside the illuminated layer without additional aids, however.

The use of cylindrical lenses or other optical elements that effect a z-dependency in the form or orientation of the point spread function (PSF) in the detection beam path does not allow the z-position to be detected both with high precision and over a large region. Further, by using elements of this kind which deform the PSF, it is not possible to produce a conventional image that is free of aberrations in addition to the localization. This may be desirable, however, in order to provide a context for the localization in the form of an image of the environment.

Light field technology significantly increases the depth of field of the detection objective whilst maintaining the light efficiency of the optical system (as opposed to reducing the numerical aperture), for which reason molecules can be detected from a larger region along the optical axis and can be localized with comparatively higher precision by means of objectives having a high numerical aperture.

Light field technology also allows the localization of molecules that are positioned directly behind one another along the detection axis (i.e. the z-axis). Other technologies, such as those using cylindrical lenses and similar optical elements, do not allow localization of molecules that are positioned directly behind one other, and if the images of two molecules are superimposed, they can often not be precisely and robustly localized. It is therefore essential to minimize the number of fluorescent molecules emitting at the same time. This means that only a few molecules can be localized in each image. However, in order to determine the structure with sufficient precision, a sufficiently high number of molecules have to be localized. Therefore, a correspondingly high number of individual images (several 1000 are usual) have to be collected, and the recording of data which allow as complete an image of the structure as possible takes a very long time. This problem is especially prevalent for thick, three-dimensional samples on account of the increased number of potentially emitting molecules, with the likelihood of the images of two molecules being superimposed, and thus not being able to be cleanly localized, increasing at the same time.

It is known that attempts are made in localization microscopy to also localize the fluorophores along the detection axis by optics being introduced into the detection beam path, the aim of which optics being to alter the PSF of the image in such a way that a measurable feature varies along the z-axis. For example, a cylindrical lens may be introduced which leads to an astigmatic PSF, the relationship of the semi-axes of the PSF now giving an indication of the z-defocus. Alternatively, spiral- and double-spiral-shaped PSFs have also been used to achieve localization along the optical axis.

Light field technology has been used in conjunction with PIV (particle imaging velocimetry) in order to localize particle streams. This demonstrated the outstanding suitability of light field technology for localizing particles. In the case of PIV, particles of which the size is significantly above 1 μm or the resolution limit of a microscope are imaged in sample volumes that are a few centimeters in size. In so doing, the precision of the localization does not exceed the diffraction limit. The localization takes place by means of scattered light, and there is no selection of particles, i.e. scattered light is detected by all the particles in the illuminated volume. Since individual molecules are not localized, the use of 'dark states' (e.g. triplet states) or similar metastable excited states of fluorescent molecules is out of the question. As mentioned above, it is microscopic particles rather than individual molecules that are imaged in PIV.

The following documents are cited as part of the above-mentioned prior art:
EP 2 244 484 A1
U.S. Pat. No. 725,567 A
DE 10 2008 009 216 A1
Cella Zanacchi, F. et al. Live-cell 3D super-resolution imaging in thick biological samples. Nat. Methods 8, 1047-1049 (2011).
Menzel et al 2014, Using a novel light field measurement system to simultaneously measure 3D-3C velocity fields and 3d surface profiles, "Lasermethoden in der Strömungsmesstechnik" Conference, 9-11 Sep. 2014.

SUMMARY

In an embodiment, the present invention provides a microscope having illumination optics for fluorescence excitation of point light sources of a sample, detection optics and a camera having a sensor. A density of the point light sources is kept low so as to minimize a crossover of point light sources that are behind or close to one another in each image captured by the camera. A means for subdividing a detection aperture into individual sub-apertures is provided in a beam path of the detection optics such that images generated by the individual sub-apertures on the sensor of the camera depict an object volume from different spatial directions.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
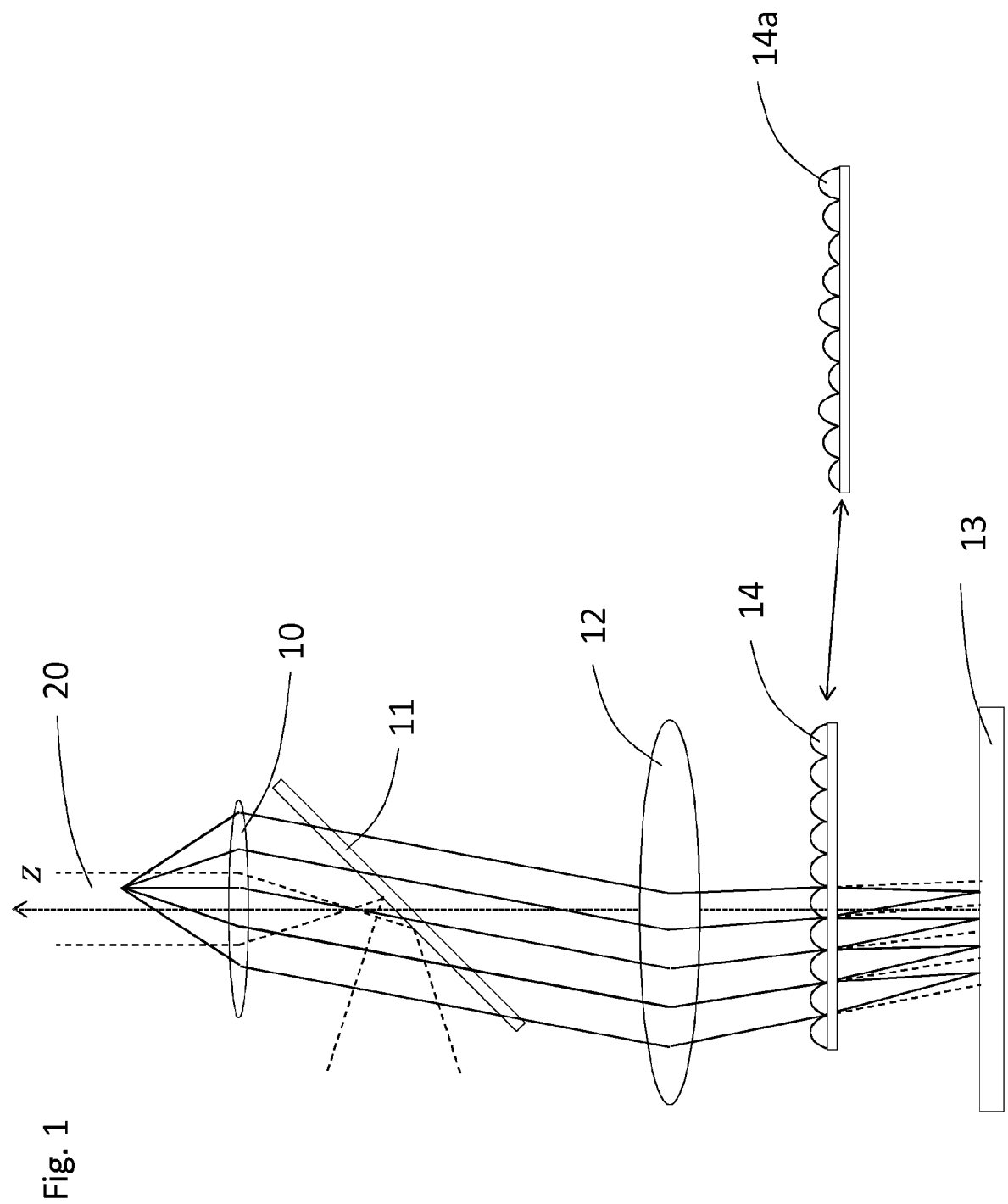
FIG. 1 shows a first embodiment of the microscope according to the invention for 3D localization by means of EPI fluorescence excitation.

Embodiments of the present invention provide a microscope and a method which ensures the localization of individual molecules or generally point light sources in three spatial dimensions.

According to an embodiment, the microscope comprises illumination optics for fluorescence excitation of point light sources of a sample, detection optics and a camera having a spatially resolving sensor, the density of the emitting point light sources being kept low in order to minimize the crossover of point light sources that are behind or close to one another in each image captured by the camera, and a means for subdividing the detection aperture into individual sub-apertures being provided in the beam path of the detection optics such that the images generated by the individual sub-apertures on the camera sensor depict an object volume from different spatial directions.

In other words, an embodiment of the invention provides a microscope for ideally over-resolved localization of individual molecules or generally point light sources in three spatial dimensions.

According to a particularly advantageous embodiment of the invention, the illumination optics include at least one light sheet by means of which the sample is illuminated from at least one direction, and the means for subdividing the detection aperture comprises a microlens array. The combination of the light field camera and the light sheet illumination provided thereby for the microscope according to an embodiment of the invention results in a light field localization technique, which is explained in more detail below.

In order to localize a point light source in 3D, at least two images of the point light source are required which are imaged by different microlenses on the sensor. Typically, however, each point light source is imaged by a plurality of microlenses, resulting in an overlap of image regions of different point light sources. Thus, each point light source occupies an area on the sensor that corresponds to many times the area of a resolution-limited image of the point light source on a sensor. In addition, point light sources from other planes perpendicular to the optical axis are also projected onto a 2D surface. The images of individual point light sources can therefore crossover. An essential aspect of an embodiment of the invention therefore consists in limiting the density of the point light sources in each individual captured image. The localization of point light sources in a three-dimensional volume is thus ensured by keeping the number thereof low in order to minimize the overlapping of image regions of different point light sources.

A smallest possible overlapping of image regions of different point light sources can be achieved by the following measures:

- by what is known as "sparse labeling"; according to this, the "density" of the fluorophores in the sample is kept sufficiently low, such as in $Ca^{2+}$ imaging of individual neurons labeled with gCamP and having genetically coded $Ca^{2+}$ probes, or when imaging the blood flow of the coloring of a subgroup of the blood cells.
- by switchable fluorophores in the case of a relatively high density of the fluorophores in the sample, with, for each image, a sufficiently small subgroup being brought into a molecular state that can be excited for fluorescence emission ("switched on") for example by photoactivation, transient binding or the like, or a sufficiently large subgroup being brought into a state that cannot be excited for fluorescence emission ("switched off");
- by selective illumination: although the density of the fluorophores themselves in the sample is too high, for each image, however, a sufficiently small subgroup of point light sources are excited so as to emit fluorescent light, such as by means of structured illumination.

The requirement proposed in the context of an embodiment of the invention for a low density of the point light sources can be fulfilled in various ways. For this purpose, the point light sources may for example be switchable fluorophores, such as dye molecules or fluorescent proteins, or quantum dots. The fluorophores can be activated for example by weak and/or short-term irradiation of light by achieving a conformity difference (PALM, STORM). The activation can also be effected for example by a chemical conformational change, which results in the point light source being put into a state that can be excited for fluorescence emission at the intended excitation wavelength. The wavelength used for switching usually differs from the wavelength that can be used to excite the fluorescence emission. Alternatively, molecules to be imaged can also transition into the on-state by a chemical bond (PAINT). In GSD microscopy, the ground state of the fluorescence excitation is depopulated by the molecules being transferred to a metastable dark state from which they can no longer be excited. In general, a method of RESOLFT microscopy can be used in which light-induced switching of the point light sources is carried out in order to ensure that only a subset of the point light sources present in the detection volume or in the sample simultaneously emit fluorescence. In principle, it is also possible to use a non-optical measure, namely by chemically ensuring a low density when coloring the sample. An alternative consists in the use of what are known as "Brainbow" organisms, which are dyed using a particular fluorescent protein, the individual molecules each emitting in one of a plurality of spectral bands. In this way, a set of suitable spectral filters can each be used to filter out a portion of the molecules.

It should be noted at this point that the aim of the 3D localization of point light sources does not necessarily have to be achieved using optical over-resolution, i.e. not below approximately $0.6\lambda/NA$.

The illumination, switching into the on, off or dark state and the fluorescence excitation of the point light sources can be carried out by means of the detection objective (epifluorescence), by means of a condenser facing the detection objective, or even particularly advantageously from the side using the light sheet (SPIM). In this case, the thickness of the light sheet is ideally set such that the entire region from which the localization is intended to take place is also illuminated for each capture of a camera image. The region from which the localization is intended to take place is typically the region within the depth of field of the detection optics, with depth of field in the context of this image designating for example the region along the optical axis within which the diameter of the image of a point light source is not above a multiple of, e.g. double, the diameter in the focus. At the same time, the illumination along the optical axis of the detection optics should be limited to this region as far as possible. For the purpose of this limitation, in particular along the detection axis, the illumination of a layer in the sample from the side (SPIM) is particularly advantageous.

According to an advantageous embodiment of the invention, the illumination optics provide a coherent or incoherent structured illumination for activating the point light sources.

If the point light sources are not switchable, the structured illumination can be used to make a subset emit light that is detected by the camera sensor. By structuring the illumination, a subgroup/subset of the point light sources located in the region of the depth of field of the detection optics is intended to be illuminated and optionally excited. This structuring can be achieved by interference of a plurality of for example two or three beams which propagate at an angle to one other through the sample volume. Alternatively, the sample can also be scanned using a focused beam. The propagation direction of the beams can advantageously be in the plane of the light sheet, which in turn coincides with the focal plane of the detection optics, or is within the depth of field of the detection optics or within the region along its optical axis in which localization is possible. If the propagation directions of the beams are in one plane, they include an angle of for example 180° for two beams and 120° for three beams. Preferably, the phase of at least one sub-beam can be varied such that the illumination pattern shifts by a fraction of the period. However, structuring of the illumination can also be achieved along the detection axis by the (mutual) tilting of individual beams against the plane of the light sheet. Overall, the aim of the structured illumination is to facilitate localization by reducing intersections and crossover of images from different point sources on the sensor. At the same time, the number of raw images required for a complete image of a plane is intended to be minimized, for example to 9.

If the point light sources are switchable fluorescent dyes/molecules, the excitation and on/off switching of said point light sources can be carried out by means of PALM, STORM, PAINT, GSD or similar methods, and these methods can be combined with the structured illumination described above.

Advantageously, the microlenses of the microlens array are larger than the spacing of the pixels on the camera sensor. The size of the microlenses of the microlens array is advantageously aligned with the image-side aperture of the detection optics such that the images from the microlenses substantially completely light up the camera sensor. The images from the microlenses on the camera sensor cover at most a region corresponding to the size of the microlenses, and there is ideally no intersection between the individual images from the microlenses.

Advantageously, the microlens array includes groups of microlenses of the same or different focal lengths, and the centers of the microlenses of the microlens array are preferably arranged on a two-dimensional Bravais lattice. In this case, images are reconstructed using an iterative algorithm as described, for example, in EP 2 244 484 A1, which allows approximately 200 planes to be resolved within the depth of field, each of the images having a number of pixels which corresponds approximately to up to one quarter of the number of pixels of the camera sensor. The special feature of the microscopy according to an embodiment of the invention consists in the reconstruction which allows for matches to be sought between the images from the individual microlenses, which can be represented particularly well for isolated particles.

The microlens array may be arranged in or near a plane conjugate to the sample or in or near a plane conjugate to the pupil. It can be designed together with the camera sensor as a light field camera, and then housed in a common housing. In an advantageous arrangement of the microlens array, said array forms, together with an upstream lens, which is preferably a tube lens and the aperture of which is sufficient for the microlens array, a Galilei or Kepler telescope.

The microscope according to an embodiment of the invention includes a post-processing device for reconstructing the localization of individual point light sources or molecules of a sample in three spatial dimensions by a triangulation-based iterative algorithm for generating a 3D image, the triangulation preferably including an iterative maximum likelihood method that takes into account optically diffractive properties of the detection optics. In a use according to an embodiment of the invention of a microlens array as a means for subdividing the detection aperture into individual sub-apertures, the iterative algorithm is preferably designed to determine matches between the images from the individual microlenses and to deduce therefrom the position of the point light source belonging to the images.

The algorithm is designed to work analogously to triangulation by parallax, which is caused by different microlenses viewing the individual point light sources from slightly different directions. The position of the image of a point light source behind a microlens and the distance of the microlens from the optical axis provide information regarding the degree of tilting of the associated PSF in the object. Each microlens images point light sources which are within a sub-aperture cone, or the diffraction-related detection volume thereof, associated with the relevant microlens, i.e. a region around an axis, on the sensor region associated with the microlens, which region is behind the microlens. The position of a point light source can thus be determined as the point of intersection of the at least two axes. Typically, matching structures in the images are determined by different microlenses. A distinction is virtually impossible in the case of point light sources, and recourse has to be taken either to the arrangement of a plurality of point light sources or a priori information.

Alternatively, the following approach is also possible: A database contains the raw sensor images of one point light source per image. The raw images cover point light sources at positions that are distributed over the entire object volume. The position of a point light source is then reconstructed by a comparison of the raw image captured by the object with a superimposition of the images from the raw image database (with variable "brightness"), and the intention is to find the superimposition of the raw images which best approximates the captured image.

The method according to embodiments of the invention for localizing point light sources of a sample in three spatial dimensions is based on the microscope according to embodiments of the invention.

Advantageously, in the method according to an embodiment of the invention, there is an especially rapid capture of a time series and a temporal and/or spatial correlation of the time-dependent signals belonging to individual sub-volumes.

Furthermore, a detectable 3D localization volume can be enlarged by shifting the sample along the optical axis of the detection optics. Alternatively or in addition, a detectable 3D localization volume can be expanded by shifting the sample along the optical axis of the detection optics.

According to an advantageous embodiment of the method according to the invention, the correlation algorithm is used calculated 3D localization points in which the correlation algorithm is used to superimpose calculated 3D localization points of different planes along the optical axis of the detection optics in such a way that a cleanly defined 3D localization volume and/or a 3D localization volume that is enlarged in the z-direction is produced. Alternatively, the correlation algorithm is advantageously used to superimpose calculated 3D localization points of different planes perpendicular to the optical axis in such a way that a 3D localization volume is produced which is enlarged perpendicularly to the optical axis. In addition, a detectable 3D localization volume can advantageously be enlarged by shifting the sample perpendicularly to the optical axis of the detection optics.

Advantageously, there is also an especially rapid capture of a time series and a temporal and/or spatial correlation of the time-dependent signals belonging to individual sub-volumes, such as with fluorescence correlation spectroscopy (FCS), image correlation spectroscopy (ICS) or spatiotemporal image correlation spectroscopy (STICS). With FCS or ICS or STICS, the fluorescence signal is measured with high temporal dynamics for one or more points in the object. Said signal is then temporally correlated with itself (autocorrelated) or temporally cross-correlated with the signals from other object points (ICS, STICS) or fluorophores (FCCS).

According to a further advantageous embodiment of the invention, the images from the individual sub-apertures are intended to be offset against one another by a suitable method for inverting the imaging properties (known as multiview deconvolution).

In addition to the possibility of "over-resolving" localization microscopy according to an embodiment of the invention, the use of the localization method according to an embodiment of the invention is particularly suitable for 3D fluorescence correlation spectroscopy (FCS) and for single-molecule tracking.

The first embodiment of a microscope shown in FIG. 1 comprises illumination optics for fluorescence excitation of point light sources of a sample. The illumination optics are designed for EPI fluorescence excitation.

The microscope from FIG. 1 further includes detection optics having a detection objective 10. In the beam path, the detection objective is followed by a dichroic mirror 11, a tube lens 12 and a camera which includes a sensor 13. A means for subdividing the detection aperture is provided between the tube lens 12 and the camera sensor 13 in the form of a microlens array 14.

The microlenses of the microlens array 14 are larger than the spacing of the pixels on the camera sensor 13, and the size of the microlenses of the microlens array 14 is aligned with the image-side aperture of the detection optics such that the images from the objective pupil reproduced by the microlenses substantially completely light up the camera sensor 13.

The microlens array 14 includes microlenses of the same focal length. Alternatively, a microlens array 14a may be used which includes groups of different focal lengths. Furthermore, the centers of the microlenses of the microlens array 14, 14a are preferably arranged on a two-dimensional Bravais lattice. In addition, it can preferably be provided for the microlens array 14, 14a to be arranged in or near a plane conjugate to the sample or in or near a plane conjugate to the pupil.

In the microscope shown in FIG. 1, the illumination source and/or a fluorophore in the sample are designed to activate only a subset of the point light sources. The means for subdividing the detection aperture into individual sub-apertures in the form of the microlens array 14, 14a, which means is arranged in the beam path of the detection optics, ensures that the images which are imaged by the individual sub-apertures on the camera sensor 13 in a spatially separate manner depict an object volume from different spatial directions.

The illumination is based on the principle of epifluorescence excitation. The excitation, switching and other beams for exciting and influencing the fluorescence emission of the point light sources 20 are coupled via a dichroic mirror which is mounted between the objective 10 and the tube lens 12. Transmitted light illumination by a condenser which faces the object 10 is also possible.

Figure 2:
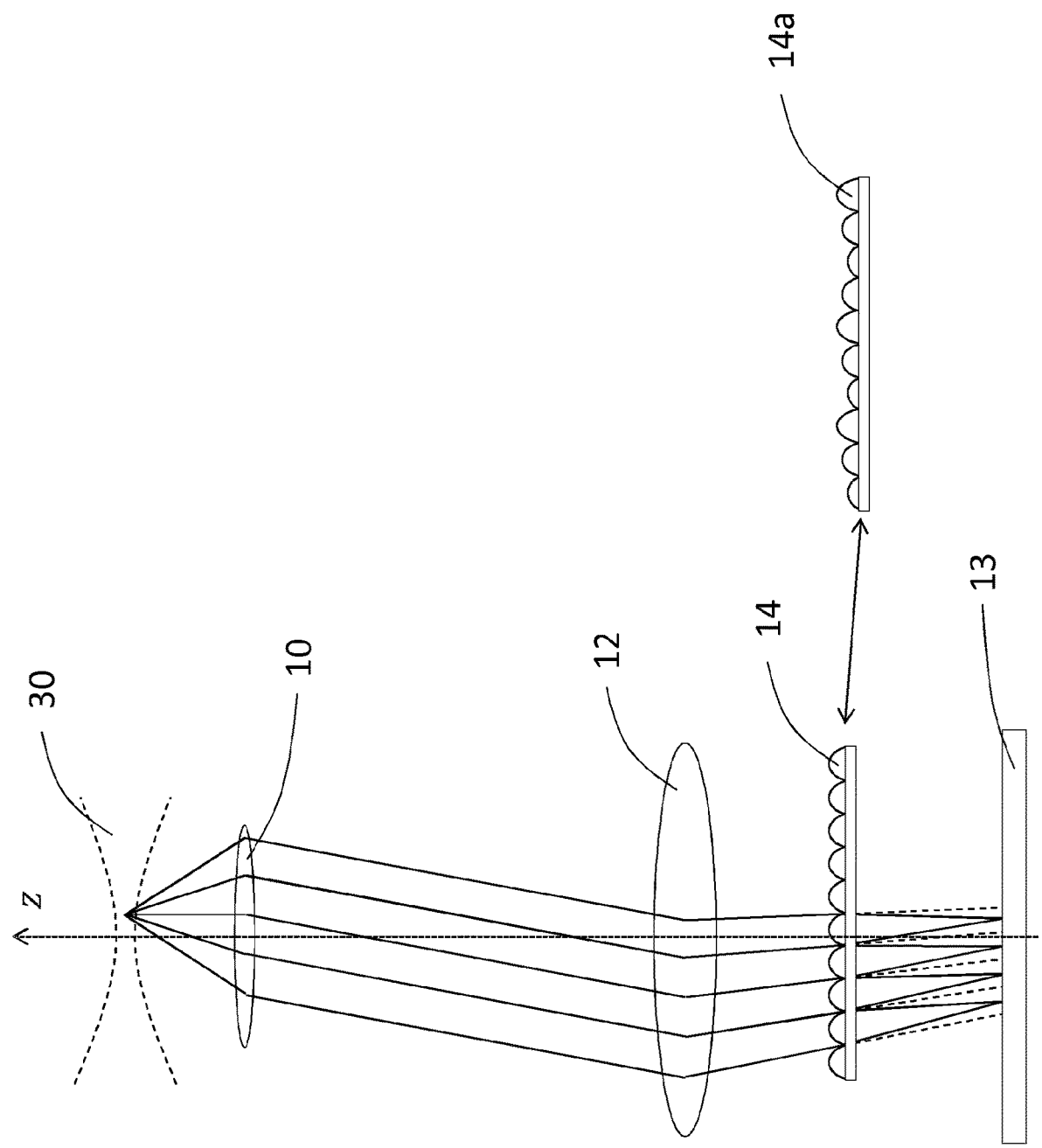
FIG. 2 shows a second embodiment of the light field microscope according to the invention for 3D localization by means of light sheet illumination.

The second embodiment of the light field microscope shown in FIG. 2 differs from the first embodiment of the light field microscope shown in FIG. 1 in that the 3D localization is carried out on the basis of light sheet illumination 30 for fluorescence excitation of point light sources of a sample, and in that the microscope from FIG. 2 does not require the dichroic mirror 13 of the microscope from FIG. 1. Both in the microscope according to FIG. 1 and FIG. 2, however, band-pass filters are typically used so that only the fluorescent light of the molecules to be localized reaches the sensor. Components of the microscope from FIG. 2 which correspond to those of the microscope from FIG. 1 are designated by the same reference numerals.

In the microscope shown in FIG. 2, the illumination source and/or a fluorophore in the sample is also designed to activate only a subset of the point light sources. The means for subdividing the detection aperture into individual sub-apertures in the form of the microlens array 14, 14a, which means is arranged in the beam path of the detection optics, ensures that the images which are imaged by the individual sub-apertures on the camera sensor 13 in a spatially separate manner depict a (common) object volume from different spatial directions.

Figure 3:
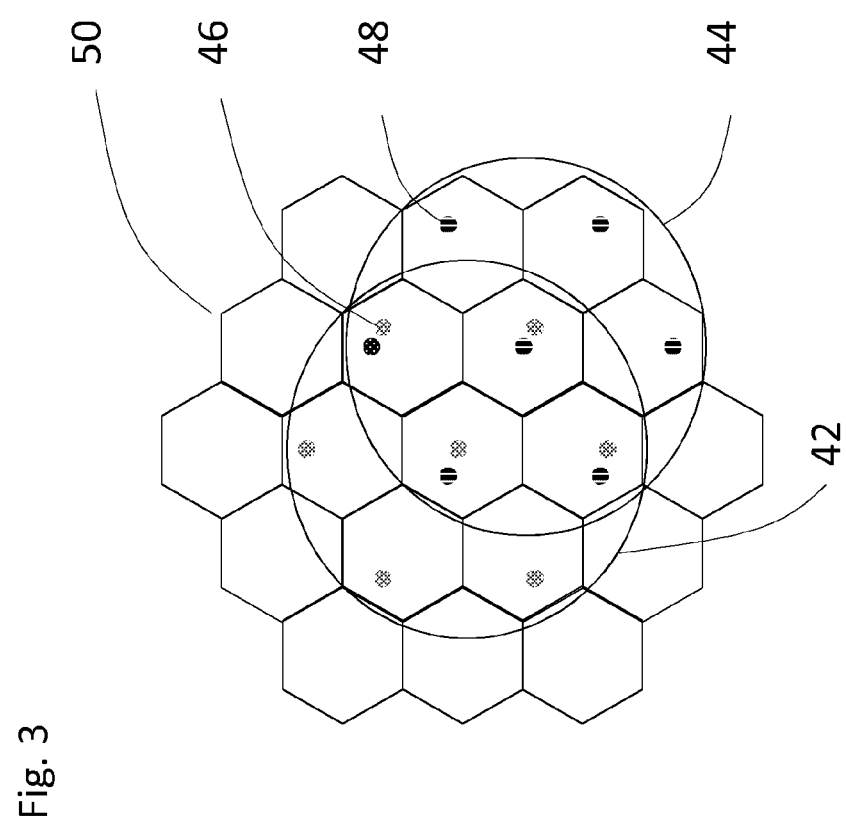
FIG. 3 shows imaging of point light sources by a plurality of microlenses of the microlens array of the microscope from FIGS. 1 and 2.

FIG. 3 shows, by way of example, how each point light source is imaged by a plurality of microlenses of the microlens array 14, 14a, resulting in an overlap of image regions of different point light sources 42, 44. Thus, each point light source occupies an area on the sensor that corresponds to many times the resolution-limited image of the point light source. In addition, point light sources from other planes perpendicular to the optical axis of the detection optics are also projected onto a 2D surface. The images 46, 48 of—preferably individual—different point light sources can therefore crossover in part. An essential aspect of an embodiment of the invention consists in limiting the density of the point light sources in each individual captured image. The localization of point light sources in a three-dimensional volume is thus ensured by keeping the number thereof low in order to minimize the overlapping of image regions of different point light sources.

It is apparent from FIG. 3 that two clearly assignable images which have been captured by different microlenses are required in order to minimize the at least of a point light source. The optimum density can be limited further. If the density of the point light sources is too high, a clear assignment is not possible. If it is too low, in some circumstances information may be lost or more individual images have to be captured for the final image. For each position in the sample, there is therefore a clear distribution of images of this sample behind the microlenses. Having more than two images helps to inspect the measured patterns for plausibility. For example, a ring of lenses will produce images of a sample. In individual images, there may be superimposition with the images of other point light sources. If overlaps never occur, or occur in only a few images, then the number of point light sources can be increased if desired. Reference numeral 50 designates the image fields of the microlenses on the sensor.

Finally, it should be noted in particular that the above-described embodiments serve merely to describe the claimed teaching, but do not restrict said teaching to the embodiments. In particular, all the features contained in this description, and/or their functions, effects and properties, considered in isolation and/or in combination with one another, which a person skilled in art of the present field would provide, optionally drawing on his knowledge in the art, individually or in combination in order to solve the objective problem or related problems, are considered to be disclosed herein.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A microscope, comprising:
    illumination optics for fluorescence excitation of point light sources of a sample;
    detection optics; and
    a camera having a sensor,
    wherein a density of the point light sources is kept low so as to minimize a crossover of point light sources that are behind or close to one another in each image captured by the camera, and
    wherein a means for subdividing a detection aperture into individual sub-apertures is provided in a beam path of the detection optics such that images generated by the individual sub-apertures on the sensor of the camera depict an object volume from different spatial directions.

2. The microscope according to claim 1, wherein the illumination optics include at least one light sheet by which the sample is illuminated from at least one direction.

3. The microscope according to claim 1, wherein the means for subdividing the detection aperture comprises a microlens array.

4. The microscope according to claim 1, wherein the point light sources are switchable fluorophores that are optically switchable by the microscope.

5. The microscope according to claim 1, wherein the illumination optics are configured to provide a coherent or incoherent structured illumination for activating the point light sources.

6. The microscope according to claim 5, wherein, in order to structure the illumination, the illumination optics are configured to provide interference of a plurality of beams which propagate at an angle to one other through the sample.

7. The microscope according to claim 3, wherein microlenses of the microlens array are larger than a spacing of pixels on the camera sensor.

8. The microscope according to claim 3, wherein a size of microlenses of the microlens array is aligned with an image-side aperture of the detection optics such that images from the microlenses substantially completely light up the sensor of the camera.

9. The microscope according to claim 3, wherein the microlens array includes groups of microlenses of same or different focal lengths, and wherein centers of microlenses of the microlens array are arranged on a two-dimensional Bravais lattice.

10. The microscope according to claim 3, wherein the microlens array is arranged in or near a plane conjugate to the sample or in or near a plane conjugate to a pupil.

11. The microscope according to claim 3, wherein the microlens array forms, together with an upstream lens, a Galilei or Kepler telescope.

12. The microscope according to claim 3, wherein the microlens array and the sensor of the camera sensor are designed as a light field camera.

13. The microscope according to claim 1, further comprising a post-processing device configured to reconstruct a localization of individual point light sources or molecules of a sample in three spatial dimensions by a triangulation-based iterative algorithm for generating a three-dimensional (3D) image.

14. The microscope according to claim 13, wherein the iterative algorithm is designed to determine matches between the images from the individual microlenses and to deduce therefrom a position of the point light source belonging to the images.

15. A method for localizing point light sources in a sample in three spatial dimensions using the microscope according to claim 1.

16. The method according to claim 15, wherein there is an especially rapid capture of a time series and a temporal and/or spatial correlation of time-dependent signals belonging to individual sub-volumes.

17. The method according to claim 15, wherein a detectable 3D localization volume is expanded by shifting the sample along an optical axis of the detection optics.

18. The method according to claim 15, wherein a correlation algorithm is used to superimpose calculated 3D localization points of different planes along an optical axis of the detection optics in such a way that a cleanly defined 3D localization volume and/or a 3D localization volume that is enlarged in the z-direction is produced.

19. The method according to claim 15, wherein a correlation algorithm is used to superimpose calculated 3D localization points of different planes perpendicular to an optical axis of the detection optics in such a way that a 3D localization volume which is enlarged perpendicularly to the optical axis is produced.

20. The method according to claim 15, wherein a detectable 3D localization volume is enlarged by shifting the sample perpendicularly to an optical axis of the detection optics.

21. The method according to claim 20, wherein there is an especially rapid capture of a time series and a temporal and/or spatial correlation of time-dependent signals belonging to individual sub-volumes.

22. The method according to claim 15, wherein the images from the individual sub-apertures are offset against one another so as to invert imaging properties.

* * * * *